Patented Oct. 18, 1927.

1,645,624

UNITED STATES PATENT OFFICE.

ERICH ROUČKA, OF BLANSKO, CZECHOSLOVAKIA.

FLOW-MEASURING SYSTEM.

Application filed January 2, 1923. Serial No. 610,391, and in Czechoslovakia April 19, 1922.

This invention relates in general to apparatus for transmitting variations in the flow of a fluid wherein a flow measuring system of the type in which a variable resistance to the flow being measured is utilized, the magnitude of said flow resistance being a measure of the flow and the variations in the flow of fluid are transmitted by impulses of auxiliary energy produced at different time positions in equal intervals of time dependent upon the magnitude of flow of fluid at the moment of the impulse so that said time positions of said impulses in corresponding intervals of time are functions and measures of the flow of fluid.

The primary object of the present invention is to provide a system of the character described in which the flow resistance is varied periodically or in regular cycles of equal intervals of time and the momentary magnitude of the said resistance or the position of the flow resisting member is a measure of the flow, whereby the flow may be measured at regular intervals.

Another object is to provide in such a system means for interrupting or stopping the actuation of the flow resisting device controlled by the means sensitive to conditions caused by variations in the flow resistance, for any desired purpose, for example, so that the time position of said interruption in the interval of the cycle of the operation of the means actuating the flow resisting device is a measure of the flow.

Further objects of the invention are to provide in such a system means sensitive to a condition caused by flow through the flow resisting device and adapted to control auxiliary energy, and means actuated by said auxiliary energy cooperating with the periodically actuated flow resisting device to produce any desired result, for example, to interrupt or stop the actuation of said flow resisting means, and to obtain other results and advantages as may be brought out by the following description.

In the accompanying drawings, I have shown one form of apparatus embodying my invention, but it will be understood that this is only for the purpose of illustrating the principles of the invention and that the invention may be embodied in many other systems of apparatus without departing from the spirit or scope of the invention.

In said drawings in which the same numerals of reference designate corresponding and like parts.

Figure 1:
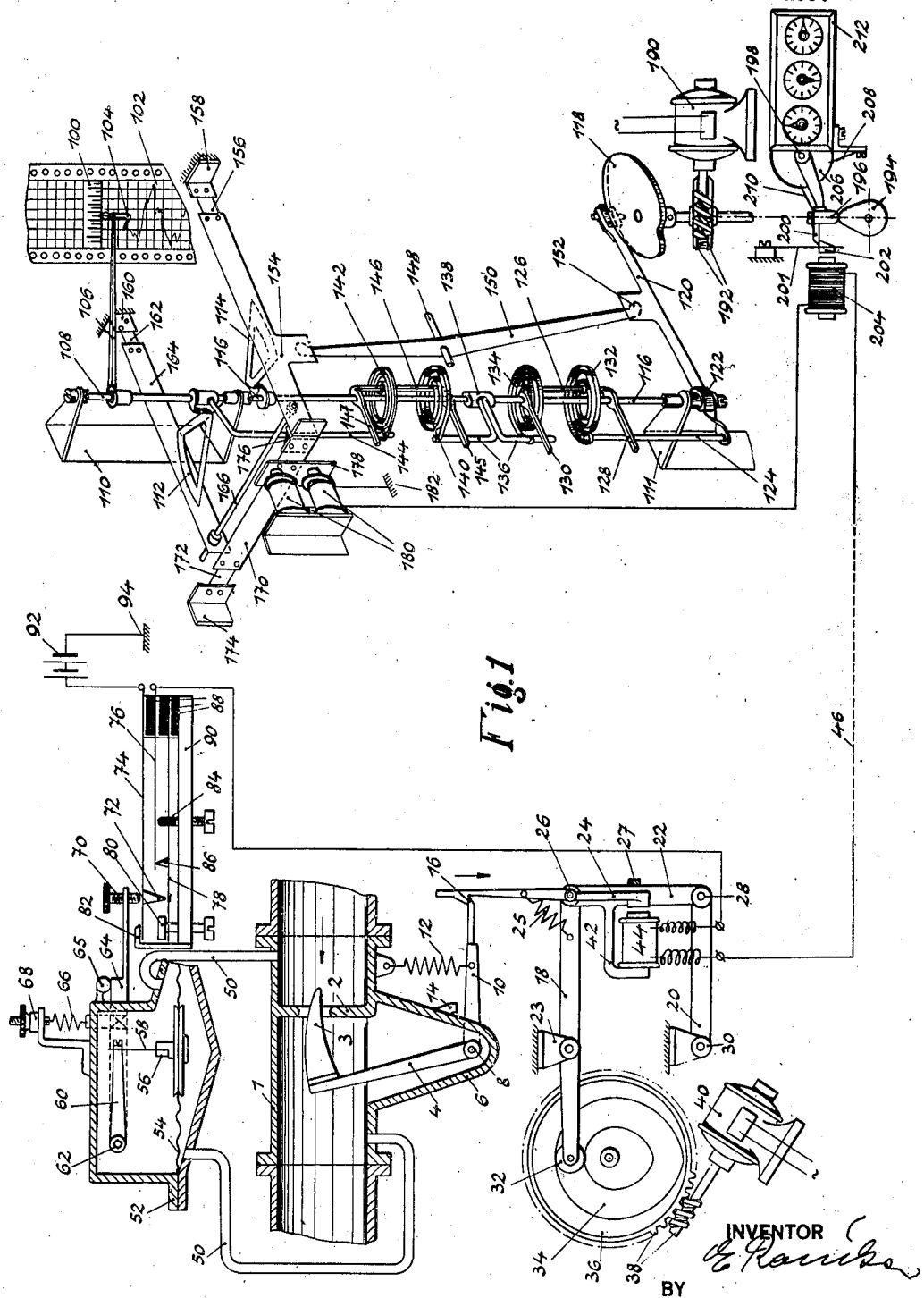
Figure 2:
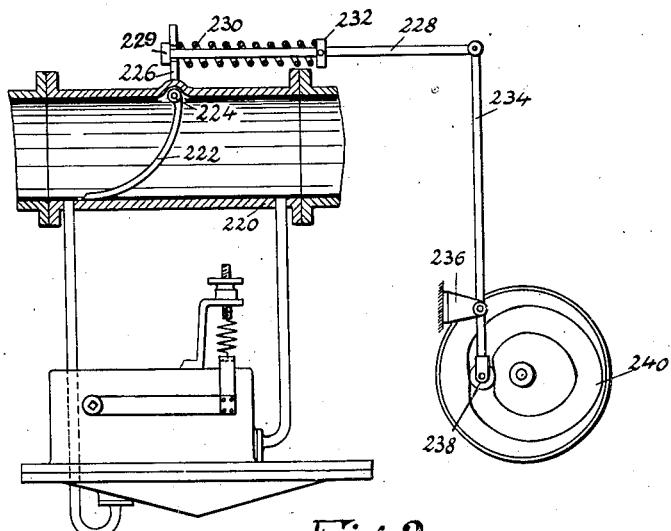

Figure 1 is a diagrammatic illustration of a flow meter embodying my invention, and Figure 2 is a diagrammatic illustration of a modified construction of flow resisting device and actuating mechanism therefor.

The device shown in the drawings consists in general of a flow resisting means comprising a casing having a flow resisting member mounted therein and arranged in a conduit through which flows the fluid to be measured. The flow resisting member is normally in the position to produce a minimum resistance to the flow of fluid and is periodically actuated in regular cycles of equal intervals of time toward the position of maximum resistance. That is, movement of the flow resisting member toward the position of maximum resistance is begun at regular intervals. Such movement of the flow resisting member produces a difference in pressure at opposite sides thereof, and means sensitive to said difference in pressure is provided to control means for interrupting or stopping said movement of the flow resisting member when a certain difference in pressure is attained. The said pressure sensitive means also closes an electric circuit when a predetermined difference in pressure is attained and controls the actuation of a means to indicate the flow of fluid. With variations in the magnitude of the flow of fluid, the said closing of the circuit by the sensitive means takes place at different time positions in the intervals of time of the cycles of actuation of the flow resisting member toward the position of maximum resistance. The indicating means is actuated in accordance with the variations in the said time positions of the closing of said electric circuit in a cycle of actuation of the flow resisting member.

More specifically the system includes a casing 1 having an orifice containing wall 2 and arranged in a conduit through which flows the fluid to be measured, said casing being provided with an extension 6 in which is pivotally mounted on a shaft 8 an arm 4 carrying a flow resisting member 3 adapted to cooperate with the orifice in the wall 2. The shaft 8 projects outwardly of the casing and is provided with an arm 10 between which and the casing 1 is arranged a tension spring 12 adapted to normally influence the arm 10 against a fixed stop 14 to actuate the flow resisting member 3 into the position of minimum resistance.

A synchronous electric motor 40 connected to any suitable source of alternating current drives through suitable gearing 38 a disk 36 having a cam groove 34 therein in which is arranged a roller 32 at one end of a lever 18 pivotally mounted intermediate its ends to a fixed support as at 23. With this construction the lever 18 is oscillated about its pivot by rotation of the disk 36 and the following of the cam groove 34 by the roller 32. The ends of the lever 18 opposite the roller 32 is pivotally connected to one end of a link 22, the opposite end of which is pivotally connected at 28 to one end of a link 20, the other end of which is pivotally connected at 30 to a fixed support. A lever 24 is pivotally mounted intermediate its ends, as at 26, on the link 22, one end of said lever being provided with a shoulder or tooth 16 adapted to engage the free end of the arm 10 on the shaft 8 of the flow resisting device. The lever 24 is thus reciprocated so that when it moves in the direction indicated by the arrow in Figure 1, the shoulder 16 engages the arm 10 and moves the flow resisting member 3 into the orifice of the wall 2 to increase the resistance to the flow of fluid through the casing 1. A spring 25 is provided for normally holding the lever 24 in position to engage the end of the arm 10, movement of the lever under the influence of said spring being limited by a stop 27 on the link 22. Thus the flow resisting member 3 is moved toward its position of maximum resistance in cycles of regular intervals of time each determined by one complete revolution of the disk 36.

The casing 1 is connected at opposite sides of the flow resisting member 3 by means of pipes 50 to opposite sides of a diaphragm 54 arranged in a casing 52 of a device sensitive to differences in pressure caused by movement of the flow resisting member 3. One side of the diaphragm 54 is connected through a stud 56 and flexible connecting member 58 to one end of an arm 60 arranged within the casing 52 and mounted on a shaft 62 projecting outwardly of the casing. The outer end of said shaft carries an arm 64 between which and an adjusting screw 68 mounted in a fixed support is connected a tension spring 66. The said spring determines the difference in pressure which will actuate the diaphragm 54 and normally influences the arm 64 against a fixed stop 65. Thus, as the flow resisting member 3 is moved toward its position of maximum resistance and the difference in pressure produced thereby reaches a predetermined value, the diaphragm 54 and lever 64 are actuated in the direction indicated by the arrow.

In accordance with the invention when this predetermined difference in pressure is attained the lever 24 is automatically disconnected from the arm 10 so as to interrupt or stop the action of the flow resisting member 3, whereupon the spring 12 returns the flow resisting member to its normal position. In the present instance an electromagnet 44 is mounted by an arm 42 on the link 22 and is adapted to cooperate with an armature on the lever 24. This magnet is connected in circuit with a source of electricity 92 and a switch mechanism controlled by the means sensitive to differences in pressure so that when said predetermined difference in pressure is obtained the circuit is closed through said electromagnet which is thereby energized to actuate the lever 24 and swing the shoulder 16 away from the arm 10.

This switch mechanism is shown as comprising a base 90 on which are mounted and insulated from each other three spacedly superposed resilient conducting strips 74, 76 and 78. The uppermost one 74 of said strips carries a contact member 72 adapted to engage the lowermost strip 78, and said strip 78 is provided with a contact point 86 adapted to contact with the intermediate strip 76. The strip 74 is shown as connected to one terminal of the source of electricity 92 and the strip 76 is connected to one terminal of the electromagnet 44 so that when the contact point 72 engages the strip 78 a circuit is closed through the said electromagnet. The said uppermost strip 74 is adapted to be actuated toward the strip 78 by an adjustable screw 70 carried by the arm 64 so that when the said arm 64 is actuated by a difference in pressure the circuit is closed through the electromagnet. The intermediate strip 76 is by its inherent resiliency influenced toward the contact point 86, and after contact has been made between the point 72 and the strip 78, further movement of said point 72 actuates the strip 78 to move the contact point 86 away from the strip 76. Movement of said strip 76 toward the strip 78 is limited by an adjustable screw 84, and when said strip 76 engages said screw, contact between the point 86 and the strip 76 and the circuit through the electromagnet are broken. It will thus be seen that a short electrical impulse is produced during the actuation of the pressure sensitive device, and the duration of said impulse may be adjusted by a screw 80 engaging the strip 78 for varying the distance between the same and the contact point 72. A stop 82 is provided for limiting movement of the strip 74 toward the arm 64. The relation of each of said impulses to the full period or cycle of movement of the means actuating the flow resisting member, or the time position of said impulse in the interval of time of said cycle of movement, is a measure of the flow of fluid. For instance, when the impulse takes place at the beginning of the movement of the flow resisting member toward its position of maximum resistance, the flow of fluid is of a maximum magnitude, while when the impulse occurs as the flow resisting member reaches its position of maximum resistance the flow of fluid is of a minimum magnitude.

The electric current from the source of electricity 92 is also utilized for actuating a measuring instrument, the said current being controlled by the switch mechanism 74—90. The measuring mechanism may be remotely positioned with relation to the flow resistance device as indicated by the broken electric wire 46. This measuring mechanism is shown as including a cam disk 118 which is driven through suitable gearing 192 by a synchronous electric motor 190 which may be connected to the same source of current as the motor 40. The said cam disk 118 is engaged by a roller mounted at one end of a lever 120 pivoted intermediate its ends at 122 on a fixed support 111, so that said lever is oscillated synchronously with the movement of the member 3, or in any other desired manner, with each position of the said lever corresponding to a certain momentary flow resistance in the casing 1. The end of the lever 120 opposite the roller is provided with an angularly projecting arm 124 connected to one end of a spiral spring 132, the other end of which is fixedly connected to a member 126 revoluble on a shaft 116 and provided with arms 128 and 130 projecting at right angles to said shaft. The said shaft 116 is also provided with a pair of oppositely disposed arms 136 fixedly connected thereto by a member 138, one of said arms being connected to one end of a spiral spring 134, the opposite end of which is connected to the said member 126. The other arm 136 is connected to one end of a spiral spring 140 the other end of which is fixedly connected to a member 146 similar to the member 126 which is provided with the arms 145 and 147 similar to the arms 128 and 130. Another spiral spring 142 has one end thereof fixedly connected to the member 146 and the other end connected to an arm 144 carried by the spindle 108 of an indicating hand 106 which is mounted in a fixed support 110 in substantial axial alinement with the shaft 116. All of the springs 132, 134, 140 and 142 are normally under mechanical tension which causes the arm 128 to be pressed against the arm 124, the arm 130 against the corresponding arm 136, the other arm 136 against the arm 145 and the arm 147 against the arm 144.

The shaft 116 is provided with a brake segment 114, and the spindle 108 is provided with a similar brake segment 112. A pair of brake bars 154 and 164 are adapted to cooperate with the respective brake segments 114 and 112, said brake bars being connected at one end by respective resilient strips 156 and 162 to fixed supports 158 and 160. The other ends of said brake bars are maintained in spaced relation by a spacing rod 166. A detent bar 170 provided with a detent shoulder 176 adapted to cooperate with the brake bar 154, is mounted by a flexible member 172 to a fixed support 174. Said detent bar is provided with an armature 178 adapted to cooperate with electromagnets 180 connected in circuit with the source of electricity 92 and the switch mechanism 74—90.

The brake bars 154 and 164 are normally in the position shown in the drawings, said brake bars being so held by the detent shoulder 176 that the brake bar 164 engages the segment 112 and prevents revolution of the spindle 108. The brake segment 114 is free to oscillate, and the arms 136, and the members 126 and 146 oscillate synchronously with the rod 124 actuated by the lever 120. The electromagnets 180 are energized upon each electric impulse produced by the closing of the switch mechanism 74—90 by the arm 64 of the pressure sensitive device, and when the magnets are so energized they attract the armature 178 and move the detent lever 170 to disengage the detent shoulder 176 from the brake bar 154. The resilient strips 156 and 162 then swing the brake bars 154 and 164 so that the brake segment 114 is engaged by the brake bar 154 and the segment 112 released by the brake bar 164. The brake segment 112 is then moved by rotation of the spindle 108 by the springs 140, 142 to assume a position corresponding to that of the segment 114. The indicating hand 106 is thus moved over a scale 100 to indicate the time positions of the impulses in the intervals of corresponding cycles and the magnitude of the flow of fluid in the casing 1. The hand 106 may also be provided with a pen point 104 to cooperate with a traveling recording strip 102 to record the flow of fluid.

After this actuation of the indicating hand 106, the brake bars 154 and 164 are returned to their normal positions by means of a lever 150 pivoted intermediate its ends on a fixed support 148 and engaging at one end the brake bar 154 and at the other end a projection 152 on the lever 120. The electric circuit having been broken, as hereinbefore described, the electromagnets 180 are de-energized so that the detent bar 170 again engages the brake bar 154 to hold the same in its normal position.

The flow of fluid may be recorded by means of an integrating instrument 212 which is actuated by rotation of a friction wheel 206. An arm 196 is pivoted on the axis 198 of the brake wheel 206 and is adapted to be actuated by a cam 194 driven by the motor 190 synchronously with the disk 118. The lever is adapted to follow said cam and when oscillated in one direction rotates the wheel 206 through a spring friction pawl 210 carried by the said lever 196, backward rotation of said wheel when the arm moves in the opposite direction being prevented by a spring friction pawl 208. The lever 196 is provided with a projection 200 adapted to cooperate with a nose on an armature 202 mounted by a flexible strip on a fixed support and adapted to cooperate with an electromagnet 204 arranged in the circuit with the switch mechanism 74—90. When the electric circuit is closed by the said switch mechanism, the magnet 204 is energized and attracts the armature 202 from engagement with the nose 200 on the lever 196. The said lever thus falls upon the cam 194 and is oscillated thereby. Should the magnet 204 be energized with the cam in the position shown in the drawings there would be no operation of the integrating mechanism which would indicate a zero flow of fluid. Should the magnet be energized with the cam in a position diametrically opposite to that shown in the drawing the integrating mechanism would be actuated to record a maximum flow of fluid. The lever 196 is always returned to its normal position shown in the drawing by the cam 194.

In Figure 2 of the drawings I have shown a modified form of flow resisting device and actuating mechanism therefor. This device includes a casing 220 having a flow resisting member 222 adapted to swing transversely thereof on a shaft 124 which projects outwardly from the casing and is provided with an arm 226. The said arm is provided with an opening through which is adapted to loosely slide a link 228 connected to one end of a lever 234 pivoted intermediate its ends to a fixed support as at 236 and provided at its other end with a roller 238 arranged in a cam groove 240 similar to the groove 34. A compression spring 230 is interposed between the arm 226 and a fixed collar 232 on the link 228. The flow resisting member 222 is actuated toward a position of minimum resistance by a head 229 on the link 228 and is actuated toward the position of maximum resistance by movement of the link 228 in the opposite direction through the spring 230. When, as the flow resisting member 222 is moved toward its position of maximum resistance, a predetermined difference in pressure at opposite sides thereof is attained, this difference in pressure overcomes the compression of the spring 230 so that the link 228 moves independently of the arm 226 and movement of the member 222 in said direction is interrupted or stopped. This construction accomplishes the same result as the spring 12 and lever 24 shown in Figure 1 of the drawings.

Having thus described the invention, what I claim is:

1. A flow device comprising an orificed member, a variable flow resisting device cooperating with said member, means for actuating said resisting device to vary the flow resistance, means responsive to variations in pressure difference caused by variations in said flow resistance, and means controlled by said responsive means to interrupt actuation of said flow resisting device by said actuating means when a certain pressure difference obtains.

2. A flow device comprising a conduit for the fluid to be measured, a variable flow resisting means arranged in said conduit, means for actuating said flow resisting means to vary the flow resistance, means responsive to variations in pressure difference caused by variations in said flow resistance, and means controlled by said responsive means to interrupt actuation of said flow resisting means by said actuating means when a certain pressure difference obtains.

3. A fluid flow device comprising a variable flow resisting means, means for actuating said flow resisting means to vary the flow resistance, a source of auxiliary energy, means actuated by said auxiliary energy for interrupting actuation of said flow resisting means by said actuating means, and means sensitive to pressure differences produced by variations in the flow resistance for controlling the third-mentioned means to interrupt actuation of said flow resisting means when a certain pressure difference obtains.

4. A fluid flow device comprising a variable flow resisting means, means for periodically actuating said flow resisting means to periodically vary the flow resistance, a source of auxiliary energy, means sensitive to pressure differences caused by variations in the flow resistance to control said auxiliary energy, and means actuated by said auxiliary energy to interrupt said actuation of said flow resisting means when a certain pressure difference obtains.

5. A fluid flow device comprising a variable flow resisting means, means for periodically actuating said flow resisting means to periodically vary the flow resistance, means sensitive to pressure differences caused by variations in the flow resistance, and means controlled by said sensitive means to interrupt actuation of said flow resisting means when a certain pressure difference obtains.

6. A flow device comprising a variable flow resisting means, means operating in regular cycles of equal intervals of time for actuating said flow resisting means to periodically vary the flow resistance during said intervals of time, means sensitive to and actuated by a predetermined pressure difference caused by variations in said flow resistance, and means controlled by said sensitive means for interrupting actuation of said flow resisting means when said predetermined pressure difference is produced.

7. A flow device comprising a variable flow resisting means, means movable with said flow resisting means so that the position thereof is varied in accordance with variations in said flow resistance, a source of auxiliary energy, means for periodically actuating said flow resisting means to periodically vary the flow resistance including means actuated by said auxiliary energy to cooperate with said movable means for varying actuation of said flow resisting means, and means sensitive to pressure differences caused by said variations in said flow resistance for controlling actuation of the last-mentioned means to vary the actuation of said flow resisting means when a certain pressure difference obtains.

8. A flow device comprising a variable flow resisting means, means actuated in accordance with variations in said flow resistance, a source of auxiliary energy, means for actuating said flow resisting means to periodically vary the flow resistance including means actuated by said auxiliary energy to cooperate with said second-mentioned means so that said auxiliary energy actuated means varies actuation of said flow resisting means, and means sensitive to pressure differences caused by variations in said flow resistance for controlling actuation of the last-mentioned means to vary the actuation of said flow resisting means when a certain pressure difference obtains.

9. A flow device comprising a variable flow resisting means, a motor for actuating said flow resisting means to vary the flow resistance, a driving connection means between said motor and said flow resisting means normally arranged to operatively connect said motor and said flow resisting means and capable of being disconnected, and means controlled by variations in pressure differences produced by variations in said flow resistance to disconnect said driving connection when a certain pressure difference obtains.

10. A flow device comprising a variable flow resisting means, a motor for actuating said flow resisting means in one direction to vary the flow resistance, means normally connecting said motor and said flow resisting means and capable of disconnection therefrom, means controlled by pressure differences caused by variations in said flow resistance to actuate said second-mentioned means to disconnect said motor and said flow resisting means when a certain pressure difference obtains, and means for actuating said flow resisting means in the other direction upon such disconnection thereof from said motor.

11. A flow device comprising a variable flow resisting means, means for actuating said flow resisting means in regular cycles of equal intervals of time to periodically vary the flow resistance, a source of auxiliary energy, means actuated by said auxiliary energy to interrupt actuation of said flow resisting means, means for controlling operation of said auxiliary energy actuated means, and means sensitive to and actuated by a predetermined pressure difference produced by variations of said flow resistance to control actuation of the last-mentioned means so as to interrupt actuation of said flow resisting means when a certain pressure difference obtains.

12. A flow device comprising a variable flow resisting means, means for actuating said flow resisting means in regular cycles of equal intervals of time to periodically increase the flow resistance, a source of auxiliary energy, means actuated by said auxiliary energy to interrupt actuation of said flow resisting means, means for controlling operation of said auxiliary energy actuated means, and means sensitive to and actuated by a predetermined pressure difference produced by variations of said flow resistance to control actuation of the last-mentioned means, so as to interrupt actuation of said flow resisting means when a certain pressure difference obtains, and means for actuating said flow resisting means to the position of minimum flow resistance after each interruption.

13. A flow device comprising a variable flow resisting means, means operating in regular cycles of equal intervals of time to connect with said flow resisting means when the latter is in position of minimum flow resistance to actuate said flow resisting means to increase the flow resistance, a source of auxiliary energy, means actuated by said auxiliary energy to disconnect said second-mentioned means from said flow resisting means, means for controlling operation of said auxiliary energy actuated means, and means sensitive to and actuated by a predetermined pressure difference caused by variations of said flow resistance to control actuation of the last-mentioned means so as to interrupt actuation of said flow resisting means when a certain pressure difference obtains.

14. Apparatus for transmitting variations in the flow of fluid comprising a variable flow resisting means, means operating in regular cycles of equal intervals of time for actuating said flow resisting means to vary the flow resistance during said intervals of time, a source of auxiliary energy, means for controlling said source of energy, means sensitive to and actuated by a predetermined pressure difference caused by variations in said flow resistance for actuating said auxiliary energy controlling means so as to produce an impulse of auxiliary energy, means to be actuated by said impulse of auxiliary energy when said predetermined pressure difference obtains for interrupting actuation of said flow resisting means, and means for conducting said impulse of auxiliary energy to the last-mentioned means.

15. Apparatus for measuring variations in the flow of fluid comprising a variable flow resisting means, means for actuating said flow resisting means in regular cycles of equal intervals of time to vary the flow resistance, a source of auxiliary energy, means for controlling said auxiliary energy, means actuated by said auxiliary energy to interrupt actuation of said flow resisting means, means sensitive to and actuated by a certain pressure difference produced by variations of the said flow resistance to actuate said means for controlling said energy when said certain pressure difference obtains so as to interrupt actuation of said flow resisting means, whereby the time position of the interruption of actuation of said flow resisting means in the interval of the corresponding cycle is a function of the flow of fluid, and means adapted to be actuated in accordance with said time position of said interruption including means movable in regular cycles synchronously with the second-mentioned means, and means actuated by said auxiliary energy simultaneously with the operation of said means for interrupting actuation of said flow resisting means to cooperate with the last-mentioned means at a point in the corresponding cycle of operation thereof dependent upon said time position of said interruption of actuation of said flow resisting means.

ERICH ROUČKA.